(12) United States Patent
Julian

(10) Patent No.: US 12,735,171 B1
(45) Date of Patent: Sep. 15, 2026

(54) WING DEPLOYMENT DEVICE

(71) Applicant: General Atomics, San Diego, CA (US)

(72) Inventor: Aaron Timothy Julian, Elkmont, AL (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 19/183,659

(22) Filed: Apr. 18, 2025

(51) Int. Cl.
*B64C 3/56* (2006.01)
*B64C 13/34* (2006.01)

(52) U.S. Cl.
CPC ................ *B64C 3/56* (2013.01); *B64C 13/34* (2013.01)

(58) Field of Classification Search
CPC .. B64C 3/56; B64C 13/34; B64C 9/36; B64C 11/28
See application file for complete search history.

(56) References Cited

U.S. PATENT DOCUMENTS 3,987,985 A 10/1976 Muller
5,141,175 A 8/1992 Harris
5,671,899 A 9/1997 Nicholas
6,758,435 B2 7/2004 Niemeyer
7,185,847 B1 3/2007 Bouchard
10,358,205 B2 7/2019 Saroka
2015/0028150 A1* 1/2015 Klein ........................ B64C 3/54 244/2
2020/0239137 A1* 7/2020 Regev ....................... B64C 3/40
2021/0403143 A1* 12/2021 Alley ..................... B64U 10/25
2023/0211902 A1* 7/2023 Abramov ............... B64U 30/12 244/49

OTHER PUBLICATIONS

PCT; International Search Report and Written Opinion of the International Searching Authority for International Patent Application No. PCT/US2026/013161 mailed Mar. 3, 2026.

* cited by examiner

*Primary Examiner* — Rodney A Bonnette
(74) *Attorney, Agent, or Firm* — Fitch, Even, Tabin & Flannery, LLP

(57) ABSTRACT

Systems, apparatuses, and methods for wing deployment by aerial objects are described. According to one or more aspects of the present disclosure, wing deployment systems (e.g., wing deployment devices, wing deployment mechanisms, etc.) may provide a means to stow a pair of wings in or on (e.g., under) an aircraft body in a stacked, or overlapped, position. Further, wing deployment systems may be configured to deploy the stowed wings to a desired sweep angle (or angles). For instance, one or more wings may be stowed in a horizontal position and may be deployed to a dihedral or anhedral angle. Moreover, a wing's vertical position may be translated upon deployment such that the difference in vertical wing position required to stow in overlapped position is reduced to zero in the deployed position or positions, as described in more detail herein.

23 Claims, 15 Drawing Sheets

800

Figure 13:
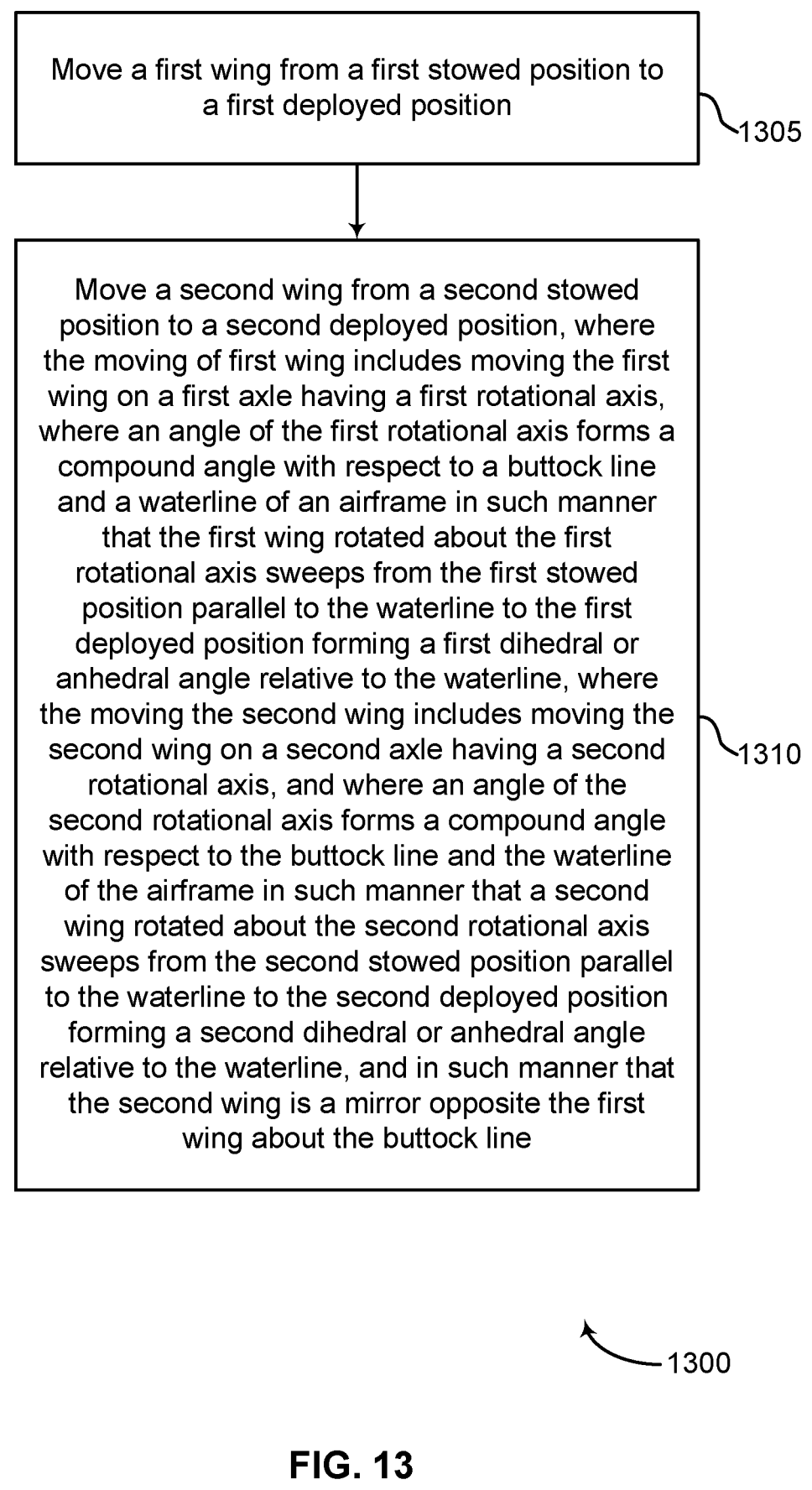

Move a first wing from a first stowed position to a first deployed position

1305

Move a second wing from a second stowed position to a second deployed position, where the moving of first wing includes moving the first wing on a first axle having a first rotational axis, where an angle of the first rotational axis forms a compound angle with respect to a buttock line and a waterline of an airframe in such manner that the first wing rotated about the first rotational axis sweeps from the first stowed position parallel to the waterline to the first deployed position forming a first dihedral or anhedral angle relative to the waterline, where the moving the second wing includes moving the second wing on a second axle having a second rotational axis, and where an angle of the second rotational axis forms a compound angle with respect to the buttock line and the waterline of the airframe in such manner that a second wing rotated about the second rotational axis sweeps from the second stowed position parallel to the waterline to the second deployed position forming a second dihedral or anhedral angle relative to the waterline, and in such manner that the second wing is a mirror opposite the first wing about the buttock line

Figure 14:
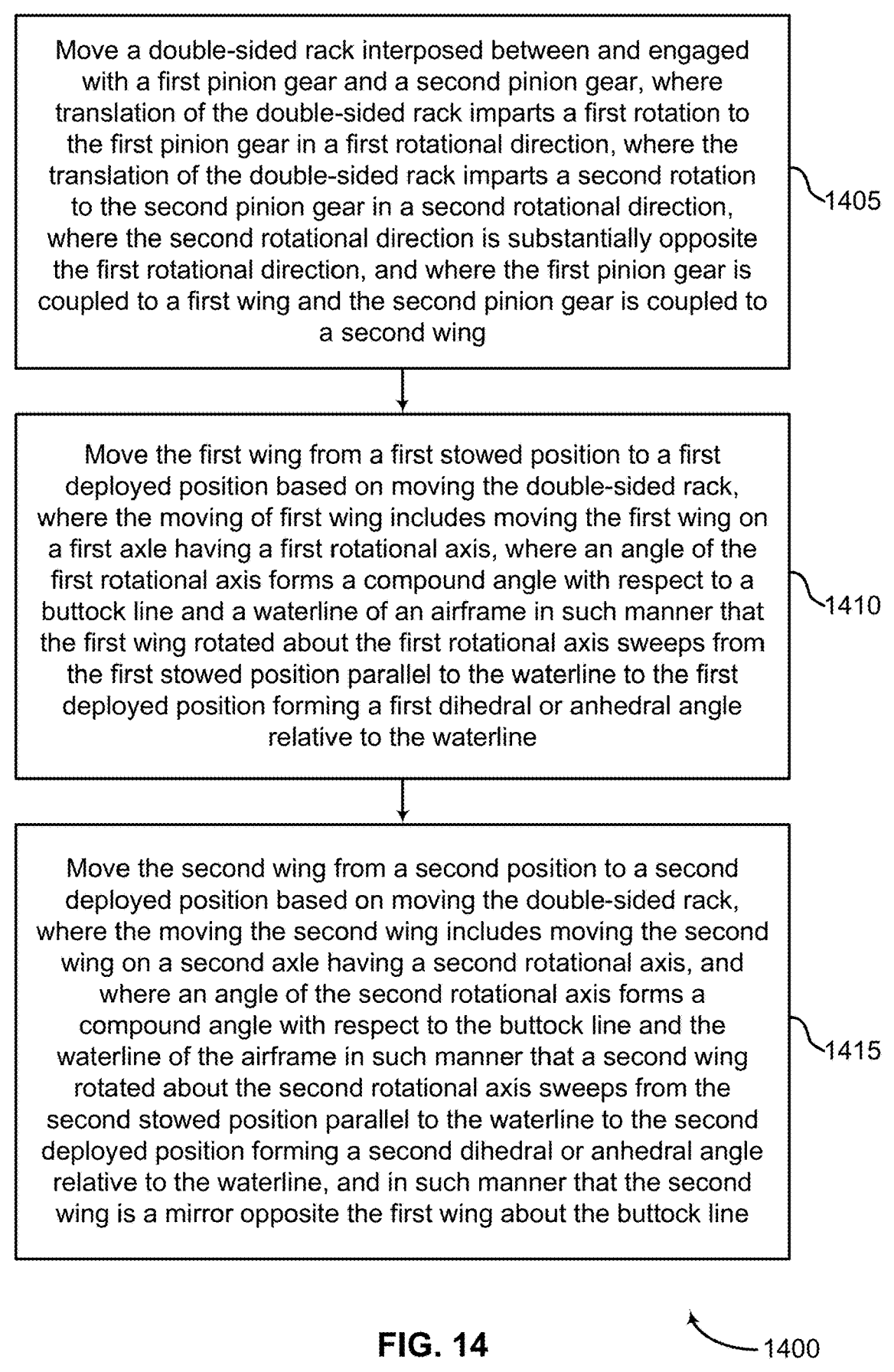

Move a double-sided rack interposed between and engaged with a first pinion gear and a second pinion gear, where translation of the double-sided rack imparts a first rotation to the first pinion gear in a first rotational direction, where the translation of the double-sided rack imparts a second rotation to the second pinion gear in a second rotational direction, where the second rotational direction is substantially opposite the first rotational direction, and where the first pinion gear is coupled to a first wing and the second pinion gear is coupled to a second wing

1405

Move the first wing from a first stowed position to a first deployed position based on moving the double-sided rack, where the moving of first wing includes moving the first wing on a first axle having a first rotational axis, where an angle of the first rotational axis forms a compound angle with respect to a buttock line and a waterline of an airframe in such manner that the first wing rotated about the first rotational axis sweeps from the first stowed position parallel to the waterline to the first deployed position forming a first dihedral or anhedral angle relative to the waterline

1410

Move the second wing from a second position to a second deployed position based on moving the double-sided rack, where the moving the second wing includes moving the second wing on a second axle having a second rotational axis, and where an angle of the second rotational axis forms a compound angle with respect to the buttock line and the waterline of the airframe in such manner that a second wing rotated about the second rotational axis sweeps from the second stowed position parallel to the waterline to the second deployed position forming a second dihedral or anhedral angle relative to the waterline, and in such manner that the second wing is a mirror opposite the first wing about the buttock line

Figure 15:
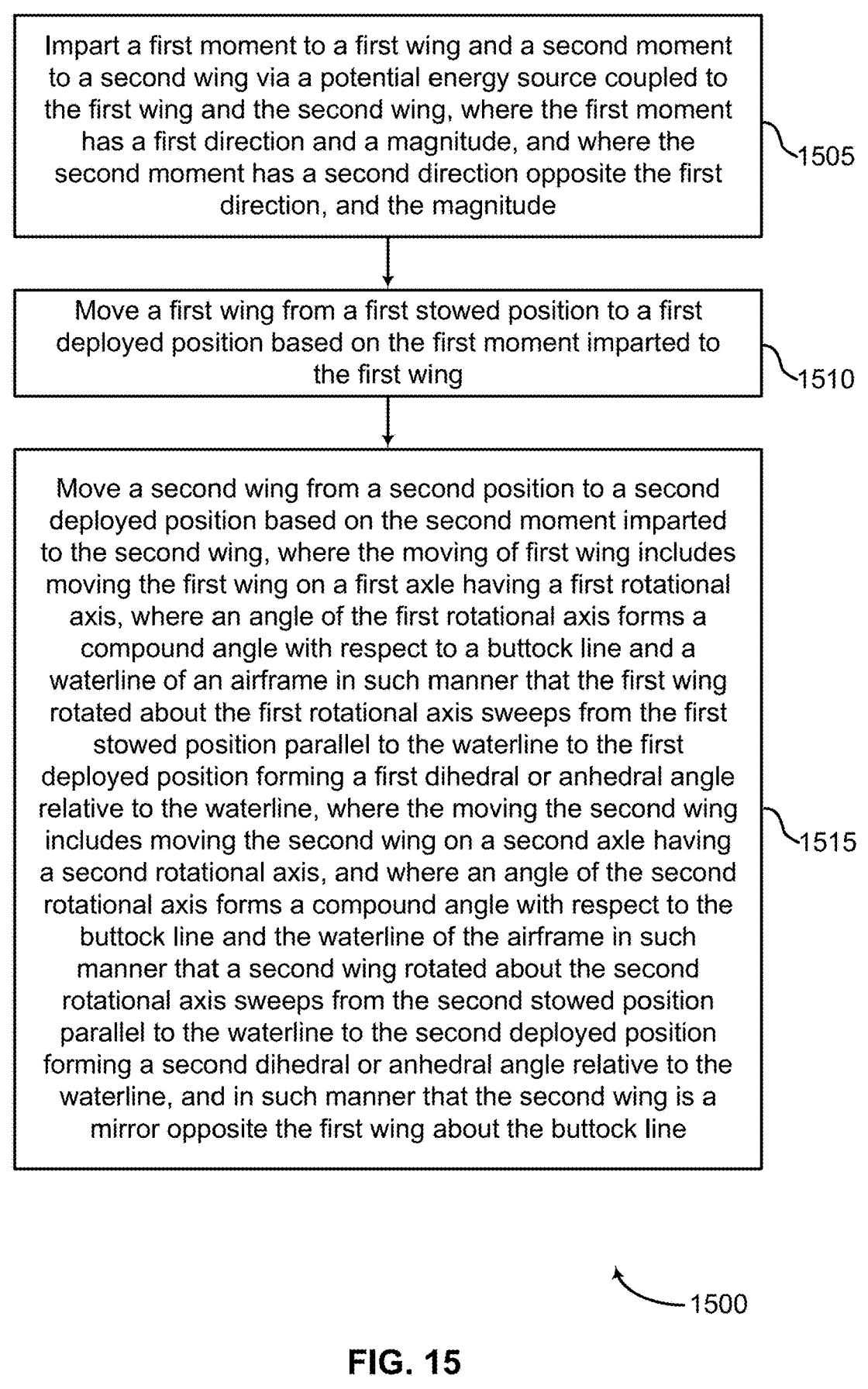

Impart a first moment to a first wing and a second moment to a second wing via a potential energy source coupled to the first wing and the second wing, where the first moment has a first direction and a magnitude, and where the second moment has a second direction opposite the first direction, and the magnitude

1505

Move a first wing from a first stowed position to a first deployed position based on the first moment imparted to the first wing

1510

Move a second wing from a second position to a second deployed position based on the second moment imparted to the second wing, where the moving of first wing includes moving the first wing on a first axle having a first rotational axis, where an angle of the first rotational axis forms a compound angle with respect to a buttock line and a waterline of an airframe in such manner that the first wing rotated about the first rotational axis sweeps from the first stowed position parallel to the waterline to the first deployed position forming a first dihedral or anhedral angle relative to the waterline, where the moving the second wing includes moving the second wing on a second axle having a second rotational axis, and where an angle of the second rotational axis forms a compound angle with respect to the buttock line and the waterline of the airframe in such manner that a second wing rotated about the second rotational axis sweeps from the second stowed position parallel to the waterline to the second deployed position forming a second dihedral or anhedral angle relative to the waterline, and in such manner that the second wing is a mirror opposite the first wing about the buttock line

WING DEPLOYMENT DEVICE

BACKGROUND OF THE INVENTION

1. Field of the Invention

The present invention relates generally to aerial vehicles, and more specifically to wing deployment by aerial vehicles.

SUMMARY

An apparatus, system, and method for wing deployment by aerial vehicles are described. One or more aspects of the apparatus, system, and method include a first axle having a first rotational axis, wherein an angle of the first rotational axis forms a compound angle with respect to a buttock line and a waterline of an airframe in such manner that a first wing rotated about the first rotational axis sweeps from a position parallel to the waterline to a swept position forming a first dihedral or anhedral angle relative to the waterline; a second axle having a second rotational axis, wherein an angle of the second rotational axis forms a compound angle with respect to the buttock line and the waterline of the airframe in such manner that a second wing rotated about the second rotational axis sweeps from a position parallel to the waterline to a swept position forming a second dihedral or anhedral angle relative to the waterline, and in such manner that the second wing is a mirror opposite the first wing about the buttock line; a first wing coupled to the first axle allowing the first wing to rotate about the first rotational axis and allowing the first wing to translate along the first axle; a second wing coupled to the second axis allowing the second wing to rotate about the second rotational axis and allowing the second wing to translate along the second axle; a first cam/follower pair, wherein the first cam/follower pair moves the first wing toward a distal end of the first axle as the first wing is moved to a deployed position; and a second cam/follower pair, wherein the second cam/follower pair moves the second wing toward a proximal end of the second axle as the second wing is moved to a deployed position, wherein the first wing and the second wing overlap one another in a stowed position.

BRIEF DESCRIPTION OF THE DRAWINGS

FIGS. 13 through 15 show examples of methods for aerial vehicles according to aspects of the present disclosure.

DETAILED DESCRIPTION

Figure 1:
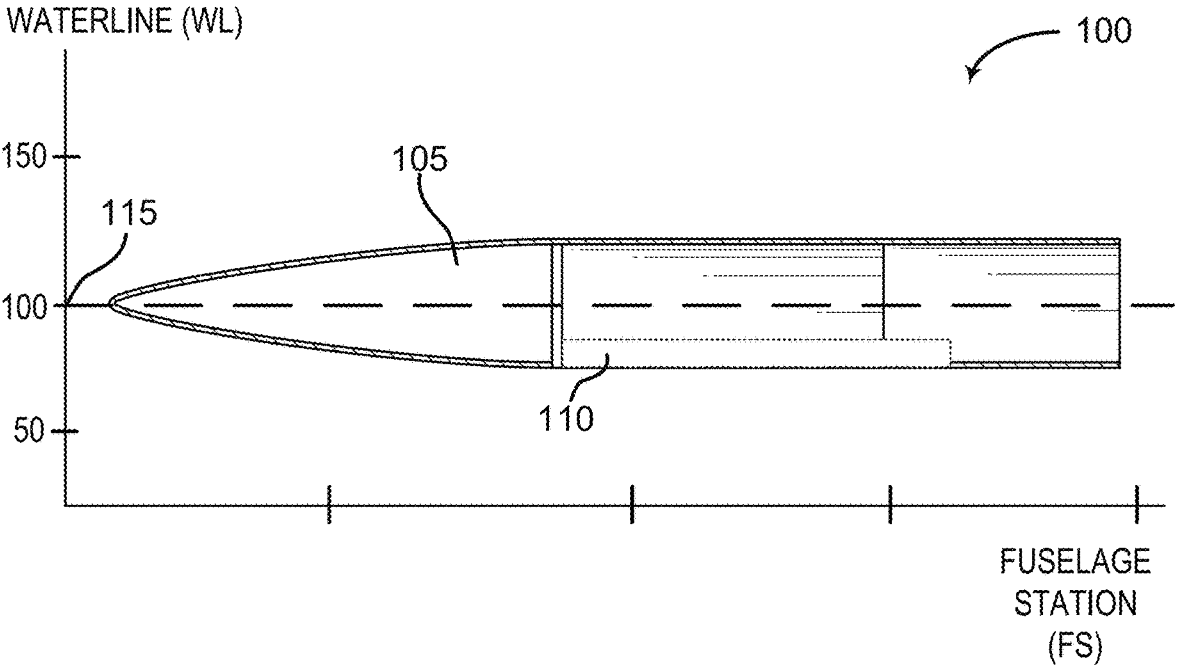
FIGS. 1 through 8 show examples of a wing deployment system according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such examples as programming, software of modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As described above, flight or flying may refer to one or more processes by which an object (e.g., an aerial vehicle, a projectile, etc.) moves through a space (e.g., such as air above the Earth's surface). In many cases, flight may be enabled and/or aided via wings (e.g., a type of fin that produces lift while moving through air). For instance, a flying object may include one or more wings that have streamlined cross-sections that are subject to aerodynamic forces and act as airfoils (e.g., where the design and analysis of wings of an aircraft is one of the principal applications of the science of aerodynamics).

In some cases, it may be desirable for flying objects to include wing deployment systems (e.g., such that wings of a flying object may be deployed, retracted, or both). However, flight systems employing wing deployment systems may face several challenges such as undesirable wing shape constraints (e.g., reduced area wings) and challenges in achieving certain wing angles efficiently during wing deployment, among other examples. For instance, prior art wing deployment solutions typically result in wings that are either smaller in area or, if overlapped when stowed, do not translate in height to eliminate rolling moment. In addition, prior art solutions did not provide dihedral (or anhedral) angle upon deployment.

According to one or more aspects of the present disclosure, wing deployment systems (e.g., wing deployment devices, wing deployment mechanisms, etc.) may provide a means to stow a pair of wings in or on (e.g., under) an aircraft body in a stacked, or overlapped, position. Further, wing deployment systems may be configured to deploy the stowed wings to a desired sweep angle (or angles). For instance, one or more wings may be stowed in a horizontal position and may be deployed to a dihedral or anhedral angle. A wing's vertical position may be translated upon deployment such that the difference in vertical wing position required to stow overlapped position is reduced to zero in the deployed position or positions, as described in more detail herein.

These systems and techniques, as well as other aspects of the present disclosure, may enable improved wing lift capacity (e.g., via an increase in possible/available wing surface area), may enable more effective wing deployment under dynamic loads, etc. One or more aspects of the present disclosure may thus be implemented for long-range projectiles, missiles (e.g., Long Range Precision Fires (LRPF) missiles), unmanned aerial vehicles (UAVs), drones, and other aerial systems, among other example uses.

FIG. 1 shows an example of a wing deployment system 100 according to aspects of the present disclosure. The example shown includes wing deployment system 100 and waterline 115, where wing deployment system 100 includes an airframe 105 and a wing deployment mechanism 110. Wing deployment system 100 is an example of, or includes aspects of, the corresponding element described with reference to FIGS. 2-8, and 12.

In some aspects, wing deployment systems 100 may be designed and configured to optimize (e.g., increase, maximize, etc.) wing surface area (e.g., the surface area of first wing and second wing of the wing deployment system 100). For instance, when stowed, a wing chordal length may fit within a glide body envelope of a wing deployment system 100. Further, in some examples, the wings (e.g., first wing and second wing) may then have a wing length (e.g., a 300 mm wing length) when deployed (e.g., when extended or swept from a stowed position in a glide body envelope to a swept position). In some aspects, a packaging height (e.g., a height of the wing deployment mechanism 110) may be minimized, a packaging width (e.g., a width of the wing deployment mechanism 110) may be minimized, etc. For instance, in some embodiments, a wing deployment system 100 may include an approximately 340 mm wide wing deployment mechanism 110.

In some aspects, one or more wings (e.g., first wing and second wing) and a wing deployment mechanism 110 may be packaged on a bottom side of the wing deployment system 100. Wing deployment system 100 may be configured such that the center of pressure (CP) of wings in a final position may be located approximately at the center of gravity (CG) of the wing deployment system 100. Additionally, in some example embodiments, wing deployment systems 100 may be designed and configured to withstand launch loads, to maintain function (e.g., to maintain missile or other projectile functions, to maintain aerial vehicular functions, etc.), to implement lightweight components, etc. In some examples, wing deployment systems 100 (e.g., wing deployment mechanisms 110) may be implemented to achieve specified or configured wing angles (e.g., such as, for instance, 15 degree dihedral wings after fly-out). In some cases, implementation of one or more aspects of the present disclosure may provide, or result in, a final sweep angle of zero degrees.

In one aspect, wing deployment system 100 includes airframe 105 and wing deployment mechanism 110. Airframe 105 is an example of, or includes aspects of, the corresponding element described with reference to FIGS. 2-8, and 12. Wing deployment mechanism 110 is an example of, or includes aspects of, the corresponding element described with reference to FIGS. 2, 3, and 6-12. Waterline 115 is an example of, or includes aspects of, the corresponding element described with reference to FIG. 4.

Figure 2:
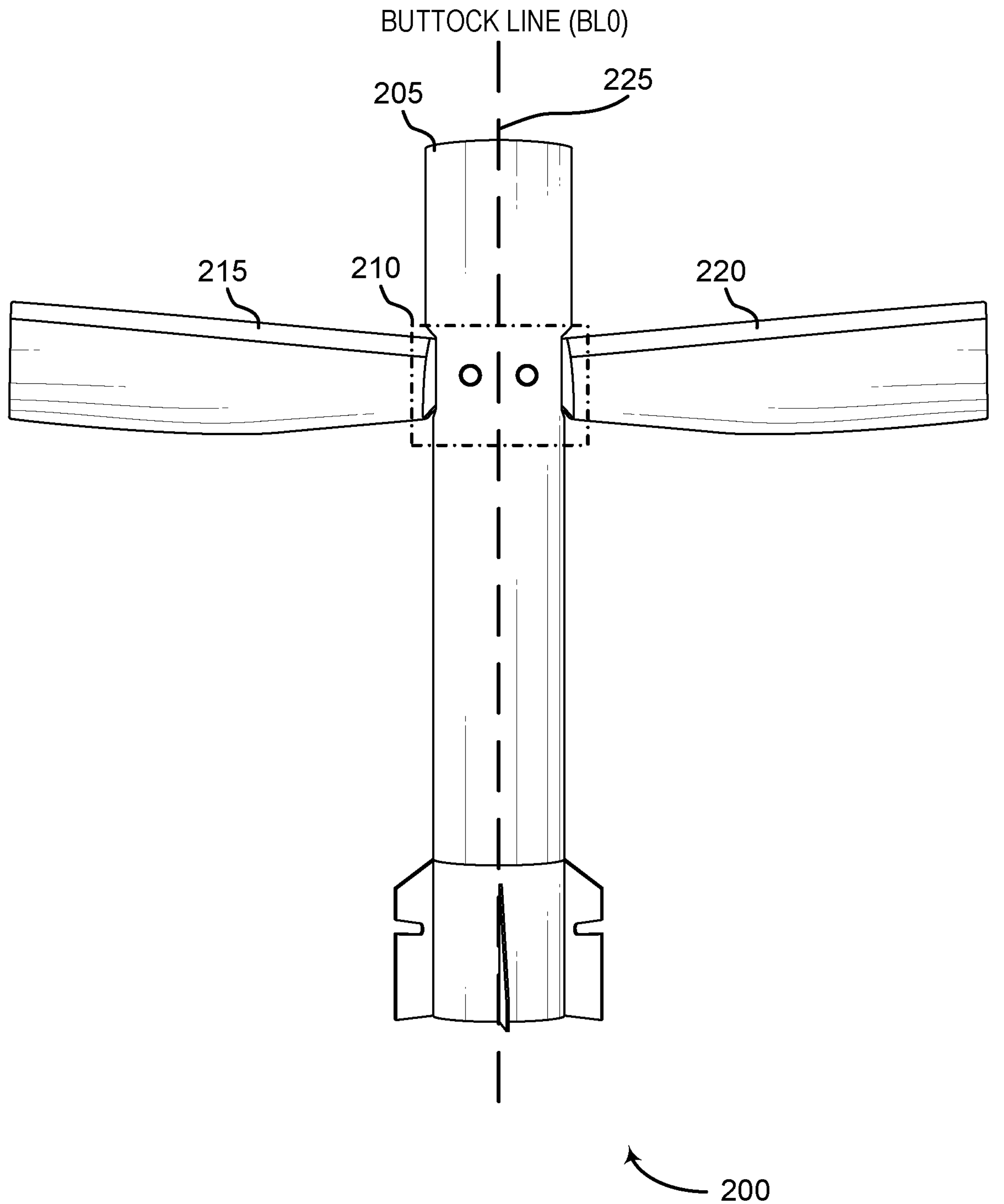

FIG. 2 shows an example of a wing deployment system 200 (e.g., a wing deployment system 200 including an airframe 205, a wing deployment mechanism 210, first wing 215, and second wing 220) according to one or more aspects of the present disclosure. Buttock line 225 of the airframe 205 is also shown. Wing deployment system 200 is an example of, or includes aspects of, the corresponding element described with reference to FIGS. 1, 3-8, and 12.

In one aspect, wing deployment system 200 includes airframe 205, wing deployment mechanism 210, first wing 215, and second wing 220. Airframe 205 is an example of, or includes aspects of, the corresponding element described with reference to FIGS. 1, 3-8, and 12. Wing deployment mechanism 210 is an example of, or includes aspects of, the corresponding element described with reference to FIGS. 1, 3, and 6-12. First wing 215 is an example of, or includes aspects of, the corresponding element described with reference to FIGS. 3-6, 8, and 12. Second wing 220 is an example of, or includes aspects of, the corresponding element described with reference to FIGS. 3, 4, 6-8, and 12.

Figure 3:
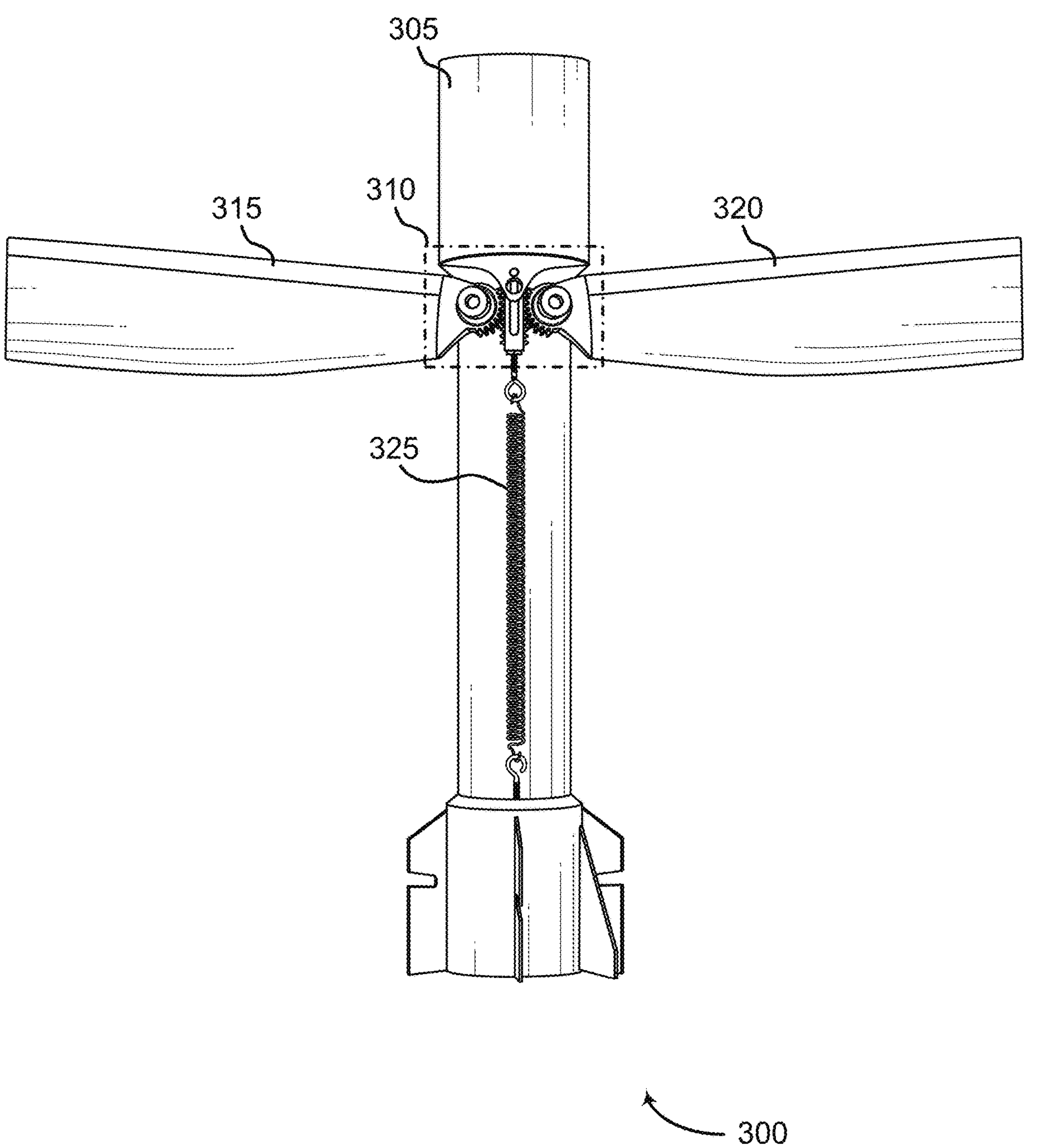

FIG. 3 shows an example of a wing deployment system 300 (e.g., a wing deployment system 300 including an airframe 305, a wing deployment mechanism 310, first wing 315, and second wing 320) according to one or more aspects of the present disclosure. Wing deployment system 300 is an example of, or includes aspects of, the corresponding element described with reference to FIGS. 1, 2, 4-8, and 12.

Generally, an airframe 305 (e.g., a body of the wing deployment system 300, such as an aerial vehicle body, a projectile body, etc.) may include any of a number of suitable materials, such as metals, alloys, fiberglass, plastics, three dimensional (3D) Acrylic Styrene Acrylonitrile (ASA), etc. Moreover, wings (e.g., airfoils) may include any of a number of suitable materials, such as metals, alloys, fiberglass, plastics, three dimensional (3D) Acrylic Styrene Acrylonitrile (ASA), etc.

In some aspects, a wing deployment system 300 may include one or more of a variety of Commercial Orbital Transportation Services (COTS) components. In some aspects, the primary potential energy source 325 (e.g., an extension spring) may initiate motion of the wing deployment mechanism 310 (e.g., and thus of the first wing 315 and second wing 320 deployed by the wing deployment system 300).

Generally, wing deployment systems 300 according to the present disclosure may include various configurations of components, components may include one or more suitable materials, etc. For example, a wing deployment system 300 may include different gap seals/covers (e.g., to minimize aerodynamic impact of the wing openings, etc.). In some cases, wing deployment systems 300 may include titanium wing hug spars, various cams, one or more suitable test fixtures, composite wings with titanium hub spars, etc. However, one or more aspects of the configurations described herein may be altered or substituted by analogy, without departing from the scope of the present disclosure. In some cases, wing deployment systems 300 may include locking features (e.g., one or more mechanisms for locking wings in a stowed state, for locking wings in a swept/deployed state, etc.), one or more pads to cushion the stopping of wings during operation of wing deployment mechanisms 310, a positive position stop (e.g., to ensure 0-deg sweep angles), release mechanisms (e.g., pull pins), etc.

In one aspect, wing deployment system 300 includes airframe 305, wing deployment mechanism 310, first wing 315, second wing 320, and primary potential energy source 325. Airframe 305 is an example of, or includes aspects of, the corresponding element described with reference to FIGS. 1, 2, 4-8, and 12. Wing deployment mechanism 310 is an example of, or includes aspects of, the corresponding element described with reference to FIGS. 1, 2, and 6-12. First wing 315 is an example of, or includes aspects of, the corresponding element described with reference to FIGS. 2, 4-6, 8, and 12. Second wing 320 is an example of, or includes aspects of, the corresponding element described with reference to FIGS. 2, 4, 6-8, and 12. Primary potential energy source 325 is an example of, or includes aspects of, the corresponding element described with reference to FIGS. 6, 8, and 12.

Figure 4:
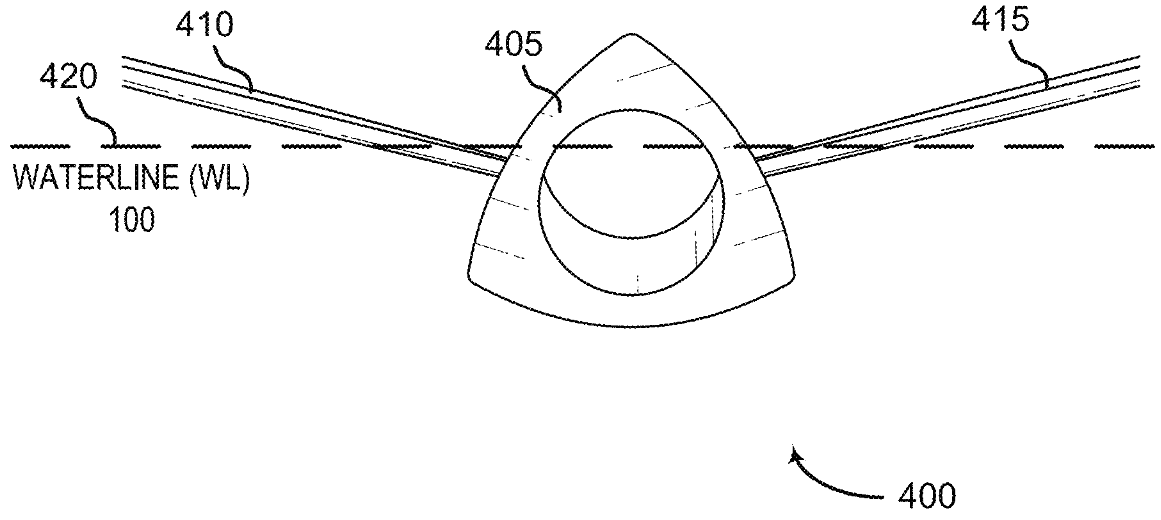

FIG. 4 shows an example of a wing deployment system 400 according to aspects of the present disclosure. The example shown includes wing deployment system 400 and waterline 420. Wing deployment system 400 is an example of, or includes aspects of, the corresponding element described with reference to FIGS. 1-3, 5-8, and 12.

In one aspect, wing deployment system 400 includes airframe 405, first wing 410, and second wing 415. Airframe 405 is an example of, or includes aspects of, the corresponding element described with reference to FIGS. 1-3, 5-8, and 12. First wing 410 is an example of, or includes aspects of, the corresponding element described with reference to FIGS. 2, 3, 5, 6, 8, and 12. Second wing 415 is an example of, or includes aspects of, the corresponding element described with reference to FIGS. 2, 3, 6-8, and 12. Waterline 420 is an example of, or includes aspects of, the corresponding element described with reference to FIG. 1.

Figure 5:
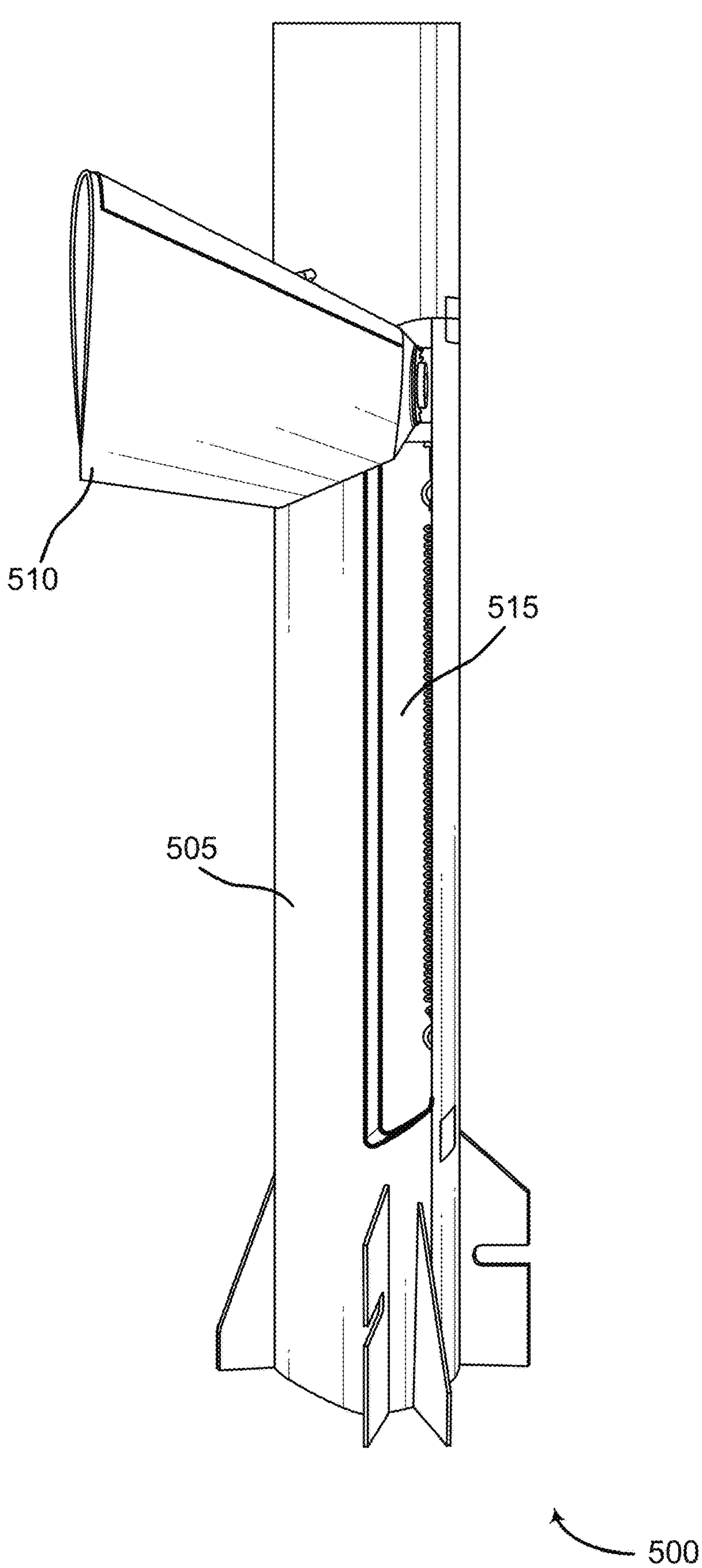

FIG. 5 shows an example of a wing deployment system 500 according to aspects of the present disclosure. Wing deployment system 500 is an example of, or includes aspects of, the corresponding element described with reference to FIGS. 1-4, 6-8, and 12. In one aspect, wing deployment system 500 includes airframe 505, first wing 510, and openings 515. Airframe 505 is an example of, or includes aspects of, the corresponding element described with reference to FIGS. 1-4, 6-8, and 12. First wing 510 is an example of, or includes aspects of, the corresponding element described with reference to FIGS. 2-4, 6, 8, and 12.

FIGS. 4 and 5 show one or more aspects of a wing deployment system 500 with wings in a deployed state, according to one or more aspects of the present disclosure. For instance, FIGS. 4 and 5 show one or more aspects of wings being translated (e.g., deployed) from an overlapping state (e.g., when stowed) to a deployed state where the wings have similar height and clear a bottom cover of the airframe 505. For example, a second wing may be mirror opposite the first wing 510 about the buttock line when the wing deployment mechanism is employed to deploy the first wing 510 and the second wing.

FIGS. 4 and 5 show different views of deployed wings (e.g., of wings deployed to achieve, for example, 15 degree dihedral wing angles).

In some aspects, FIG. 5 may show openings 515 that may be covered (e.g., via a pair of covers) after wing deployment, in some embodiments. In some aspects, the pair of covers may be implemented to cover the side openings 515 (e.g., the side openings 515 of the airframe 505 or body of the wing deployment system 500) before and/or after deployment of the wings (e.g., to reduce or minimize aero impact). For example, FIG. 5 shows aspects of a first wing 510 deployed, where a wing deployment mechanism may deploy the first wing 510 after covers are removed and openings 515 are exposed to allow the first wing 510 to be deployed from the stowed position within the airframe 505 to a swept position or a deployed position.

Figure 6:
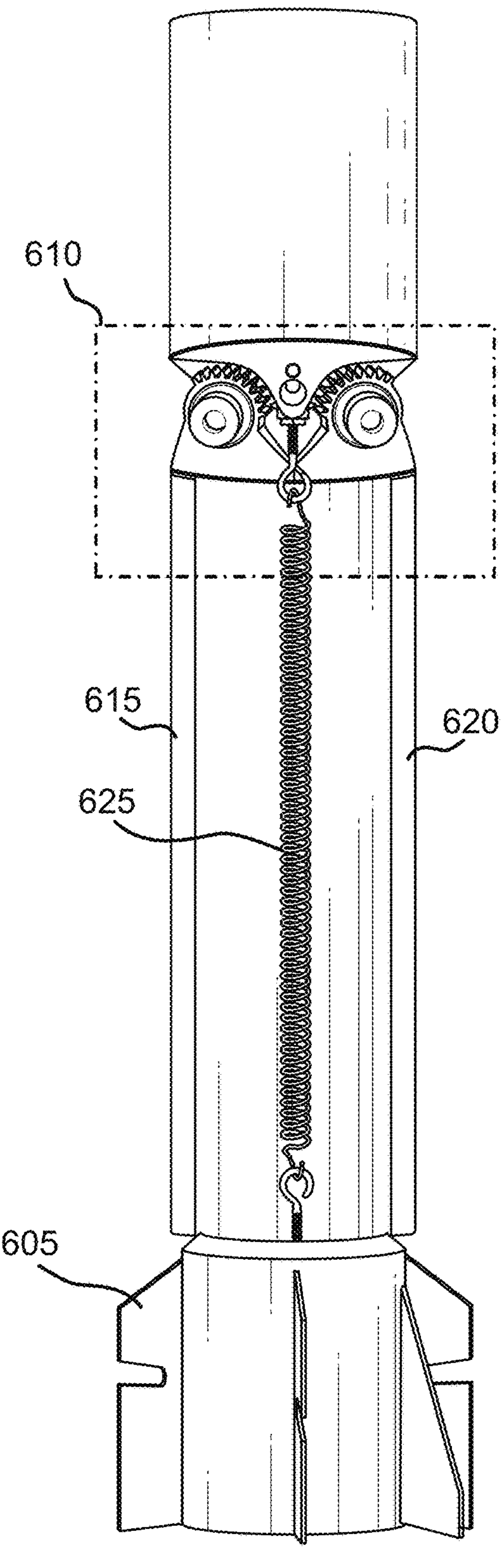

FIG. 6 shows an example of a wing deployment system 600 according to aspects of the present disclosure. Wing deployment system 600 is an example of, or includes aspects of, the corresponding element described with reference to FIGS. 1-5, 7, 8, and 12.

In some aspects, FIG. 6 may illustrate wings (e.g., first wing 615 and second wing 620) that are full-width of the airframe 605 (e.g., wings that are full-width of a projectile body), which may increase (e.g., maximize) the wing surface area that may be designed/implemented. For instance, first wing 615 and second wing 620 may each have a width approximately equal to (e.g., equal to, or slightly less than) the width of the airframe 605. Moreover, in some embodiments, the first wing 615 and second wing 620 may be overlapping when stowed (e.g., aspects of which are shown in the example of FIG. 6).

In one aspect, wing deployment system 600 includes airframe 605, wing deployment mechanism 610, first wing 615, second wing 620, and primary potential energy source 625. Airframe 605 is an example of, or includes aspects of, the corresponding element described with reference to FIGS. 1-5, 7, 8, and 12. Wing deployment mechanism 610 is an example of, or includes aspects of, the corresponding element described with reference to FIGS. 1-3, and 7-12. First wing 615 is an example of, or includes aspects of, the corresponding element described with reference to FIGS. 2-5, 8, and 12. Second wing 620 is an example of, or includes aspects of, the corresponding element described with reference to FIGS. 2-4, 7, 8, and 12. Primary potential energy source 625 is an example of, or includes aspects of, the corresponding element described with reference to FIGS. 3, 8, and 12.

Figure 7:
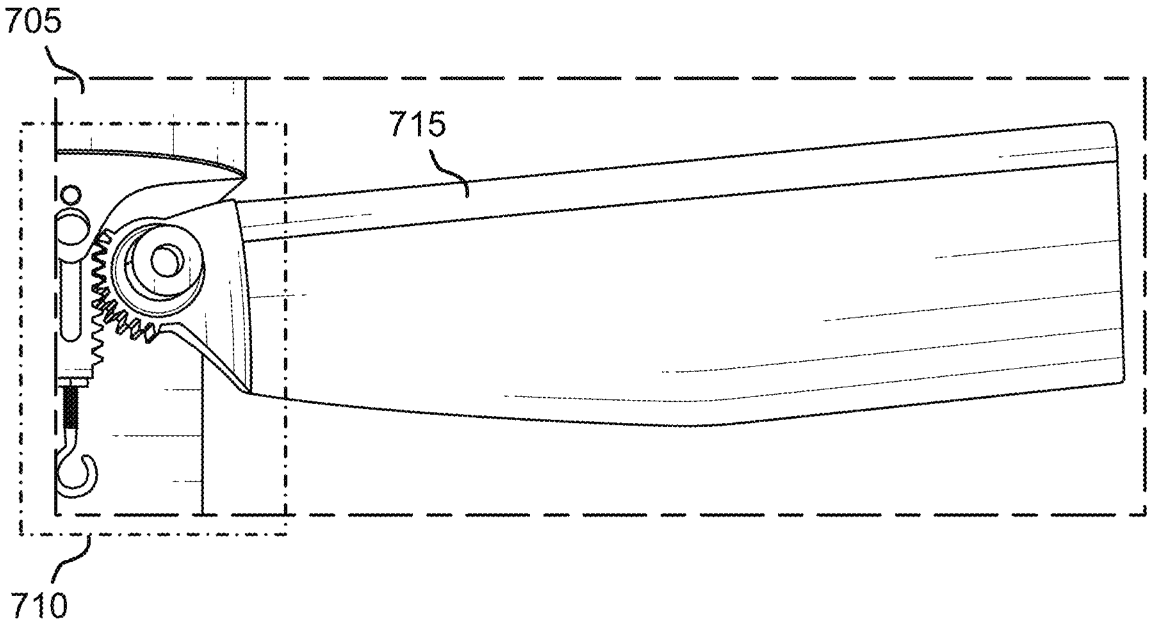

FIG. 7 shows an example of a wing deployment system 700 according to aspects of the present disclosure. In some aspects, FIG. 7 shows additional wing details according to an example embodiment. For instance, in some embodiments, wings of a wing deployment system 700 (e.g., such as second wing 715) may include one or more suitable materials or components, such as a carbon fiber-epoxy skin over poured foam core, a 3D-printed Ultem plastic hub-spar, and an aluminum foil leading edge. In some examples, the final hub-spar may be titanium (e.g., which may have reduced or minimal impact on performance of the wing deployment mechanism 710, since the change in moment of inertia about the rotation axis may be very small). In some embodiments, for example, wing weight may be approximately 0.5 pounds per wing (e.g., a first wing and second wing 715 (shown) may weigh approximately 0.5 pounds).

Wing deployment system 700 is an example of, or includes aspects of, the corresponding element described with reference to FIGS. 1-6, 8, and 12. In one aspect, wing deployment system 700 includes airframe 705, wing deployment mechanism 710, and second wing 715. Airframe 705 is an example of, or includes aspects of, the corresponding element described with reference to FIGS. 1-6, 8, and 12. Wing deployment mechanism 710 is an example of, or includes aspects of, the corresponding element described with reference to FIGS. 1-3, 6, and 8-12. Second wing 715 is an example of, or includes aspects of, the corresponding element described with reference to FIGS. 2-4, 6, 8, and 12.

Figure 8:
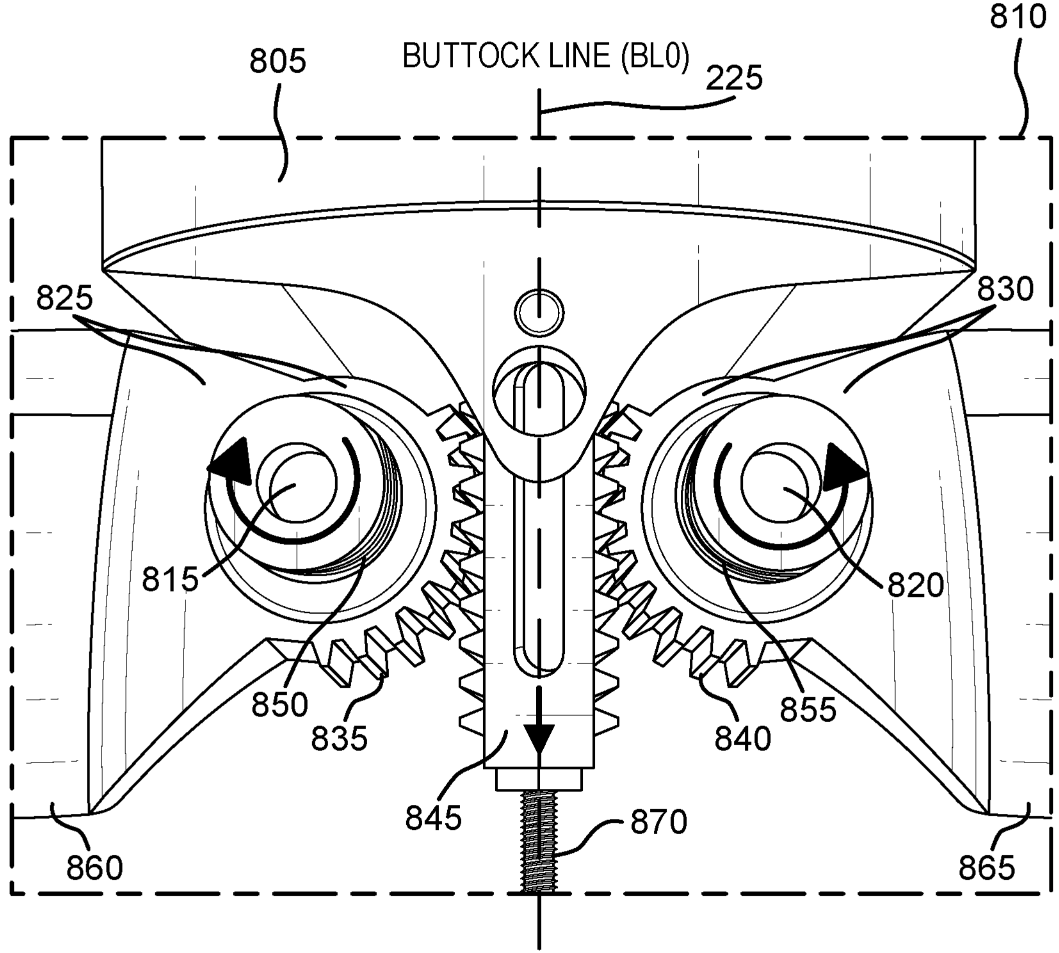

FIG. 8 shows sweep mechanism kinematic details of a wing deployment mechanism 810, according to one or more aspects of the techniques described herein. For example, a wing deployment mechanism 810 may implement a rack 845 (e.g., a double-sided rack 845) with two pinion gears (e.g., first pinion gear 835 and second pinion gear 840). In some aspects, the rack 845 may slide into a body cutout in a stowed position. Buttock line 225 is also shown.

For operation of the wing deployment mechanism 810, the rack 845 may be moved (e.g., the rack 845 may be pulled by primary potential energy source 870, which may be an extension spring, in some embodiments). Movement (e.g., displacement) of the rack 845 may force the pinion gears (e.g., the first pinion gear 835 and the second pinion gear 840) to rotate in substantially opposite directions (e.g., in such manner that rotation of the second pinion gear 840 is mirror opposite the first pinion gear 835 about the buttock line 225). The forced rotation of the first pinion gear 835 and the second pinion gear 840 may displace (or sweep) the first wing 860 and the second wing 865 out in opposite directions (e.g., in such manner that the second wing 865 is a mirror opposite the first wing 860 about the buttock line 225). This movements of the rack 845 and the pinion gears 835 840 are indicated by the directional arrows of FIG. 8.

In one example embodiment, a shoulder bolt (e.g., a 0.5 inch shoulder bolt) may be implemented through a bushing in a wing hub (e.g., and the shoulder bolt may attach a wing to the airframe 805). In some aspects, first axle may attach first wing 860 to the airframe 805, and second axle may attach second wing 865 to the airframe 805. Hubs may rotate and translate on the shank of the bolt (e.g., respective hubs may rotate and translate on first axle and second axle).

Moreover, wing deployment mechanism 810 may include first potential energy source 850 and second potential energy source 855. For instance, first potential energy source 850 (e.g., a first conical compression spring) may provide force to maintain first cam/follower pair 825 contact, and second potential energy source 855 (e.g., a second conical compression spring) may provide force to maintain second cam/follower pair 830 contact.

In some embodiments, the rack 845 may include a slot, and the wing deployment mechanism 810 and/or airframe 805 may include a dowel pin configured to align in the slot of the rack 845 to guide the motion of the rack 845 (e.g., to guide the motion of the rack 845 relative to the wing deployment mechanism 810 and/or airframe 805). Additionally or alternatively, in some embodiments, the wing deployment mechanism 810 and/or airframe 805 may include a ball detent pin on the top side of the rack 845 (e.g., such that a groove on the top side of the rack 845 may be configured to accept the ball).

According to the present disclosure, various configurations of apparatuses and systems (e.g., a wing deployment systems 800, wing deployment mechanisms 810, etc.) are enabled. In one example embodiment, a wing deployment system 800 may include at least a first axle, a second axle, a first wing 860, a second wing 865, a first cam/follower pair 825, and a second cam/follower pair. The first axle 815 may have a first rotational axis, where an angle of the first rotational axis forms a compound angle with respect to a buttock line and a waterline of an airframe 805 in such manner that a first wing 860 rotated about the first rotational axis sweeps from a position parallel to the waterline to a swept position forming a first dihedral or anhedral angle relative to the waterline. Further, the second axle 820 may have a second rotational axis, where an angle of the second rotational axis forms a compound angle with respect to the buttock line and the waterline of the airframe 805 in such manner that a second wing 865 rotated about the second rotational axis sweeps from a position parallel to the waterline to a swept position forming a second dihedral or anhedral angle relative to the waterline. As described in more detail herein, the first wing 860 and second wing 865 are deployed in such manner that the second wing 865 is a mirror opposite the first wing 860 about the buttock line.

Moreover, the first wing 860 may be coupled to the first axle 815 allowing the first wing 860 to rotate about the first rotational axis and allowing the first wing 860 to translate along the first axle 815, and the second wing 865 may be coupled to the second axis allowing the second wing 865 to rotate about the second rotational axis and allowing the second wing 865 to translate along the second axle 820. The first cam/follower pair 825 may move the first wing 860 toward a distal end of the first axle 815 as the first wing 860 is moved to a deployed position, and the second cam/follower pair 830 may move the second wing 865 toward a proximal end of the second axle 820 as the second wing 865 is moved to a deployed position (e.g., where the first wing 860 and the second wing 865 overlap one another in a stowed position, as described in more detail herein, for example, with reference to at least FIGS. 1, 5, 6, and 12).

In some embodiments, a wing deployment system 800 may further include a first pinion gear 835 coupled to the first wing 860, a second pinion gear 840 coupled to the second wing 865, and a rack 845 (e.g., a double-sided rack 845). For example, a double-sided rack 845 may be interposed between and engaged with the first pinion gear 835 and the second pinion gear 840, where translation of the double-sided rack 845 imparts a first rotation to the first pinion gear 835 in a first rotational direction, and where the translation of the double-sided rack 845 imparts a second rotation to the second pinion gear 840 in a second rotational direction (e.g., where the second rotational direction is substantially opposite the first rotational direction, as described in more detail herein).

In some embodiments, a wing deployment system 800 may further include a first potential energy source 850 interposed between the distal end of the first axle 815 and the first wing 860, as well as a second potential energy source 855 interposed between the distal end of the second axle 820 and the second wing 865 (e.g., where the first axle and the second axle are coupled to the airframe 805). In some examples, the first potential energy source 850 comprises a first spring and the second potential energy source 855 comprises a second spring. In some examples, the first potential energy source 850 imparts a force to maintain the first cam/follower pair 825 in contact with one another, and the second potential energy source 855 imparts a force to maintain the second cam/follower pair 830 in contact with one another.

In some embodiments, a wing deployment system 800 may further include a potential energy source (e.g., a primary potential energy source 870) coupled to the first wing 860 and the second wing 865 wherein the primary potential energy source 870 imparts a first moment to the first wing 860, and a second moment to the second wing 865. In some aspects, the first moment has a first direction and a magnitude, and the second moment has a second direction opposite the first direction, and the magnitude. In some aspects, the wing deployment system 800 may further include a rack 845 (e.g., a double-sided rack 845) that couples the primary potential energy source 870 to the first wing 860 and the second wing 865. In some aspects, the primary potential energy source 870 is coupled to the rack 845, and the primary potential energy source 870 applies a linear force to the rack 845. In some embodiments, a wing deployment system 800 may further include a first pinion gear 835 coupled to the first wing 860, wherein the first pinion gear 835 engages with the rack 845. In some embodiments, a wing deployment system 800 may further include a first pinion gear 835 coupled to the first wing 860, where the first pinion gear 835 engages with a first side of the double-sided rack 845, as well as a second pinion gear 840 coupled to the second wing 865, where the second pinion gear 840 engages with a second side of the double-sided rack 845.

In some embodiments, a wing deployment system 800 may further include a pair of openings for deploying the first wing 860 and the second wing 865, where the pair of openings is below the waterline (e.g., aspects of which are described in more detail herein, for example, with reference to at least FIGS. 1, 4, and 5). In some embodiments, a wing deployment system 800 may further include a pair of covers, where the pair of covers moves from a closed position to an open position to expose the first wing 860 and the second wing 865 at side openings of the airframe 805 before full deployment of the first wing 860 and the second wing 865

(e.g., aspects of which are described in more detail herein, for example, with reference to at least FIGS. 1, 4, and 5).

In some aspects, the first dihedral or anhedral angle (e.g., of the first wing 860) and the second dihedral or anhedral angle (e.g., of the second wing 865) have a magnitude of at least 5 degrees. In some aspects, the first dihedral or anhedral angle (e.g., of the first wing 860) and the second dihedral or anhedral angle (e.g., of the second wing 865) have a magnitude of at least 15 degrees.

Wing deployment system 800 is an example of, or includes aspects of, the corresponding element described with reference to FIGS. 1-7, and 12. In one aspect, wing includes deployment system 800 airframe 805, wing deployment mechanism 810, first wing 860, second wing 865, and primary potential energy source 870. Airframe 805 is an example of, or includes aspects of, the corresponding element described with reference to FIGS. 1-7, and 12. Wing deployment mechanism 810 is an example of, or includes aspects of, the corresponding element described with reference to FIGS. 1-3, 6, 7, and 9-12.

In one aspect, wing deployment mechanism 810 includes first axle 815, second axle 820, first cam/follower pair 825, second cam/follower pair 830, first pinion gear 835, second pinion gear 840, rack 845, first potential energy source 850, and second potential energy source 855. First axle 815 is an example of, or includes aspects of, the corresponding element described with reference to FIGS. 9 and 11. Second axle 820 is an example of, or includes aspects of, the corresponding element described with reference to FIGS. 10 and 11. First cam/follower pair 825 is an example of, or includes aspects of, the corresponding element described with reference to FIGS. 9 and 11. Second cam/follower pair 830 is an example of, or includes aspects of, the corresponding element described with reference to FIGS. 10 and 11. First pinion gear 835 is an example of, or includes aspects of, the corresponding element described with reference to FIG. 11. Second pinion gear 840 is an example of, or includes aspects of, the corresponding element described with reference to FIG. 11. Rack 845 is an example of, or includes aspects of, the corresponding element described with reference to FIG. 11. First potential energy source 850 is an example of, or includes aspects of, the corresponding element described with reference to FIGS. 9 and 11. Second potential energy source 855 is an example of, or includes aspects of, the corresponding element described with reference to FIGS. 10 and 11. First wing 860 is an example of, or includes aspects of, the corresponding element described with reference to FIGS. 2-6, and 12. Second wing 865 is an example of, or includes aspects of, the corresponding element described with reference to FIGS. 2-4, 6, 7, and 12. Primary potential energy source 870 is an example of, or includes aspects of, the corresponding element described with reference to FIGS. 3, 6, and 12.

Figure 9:
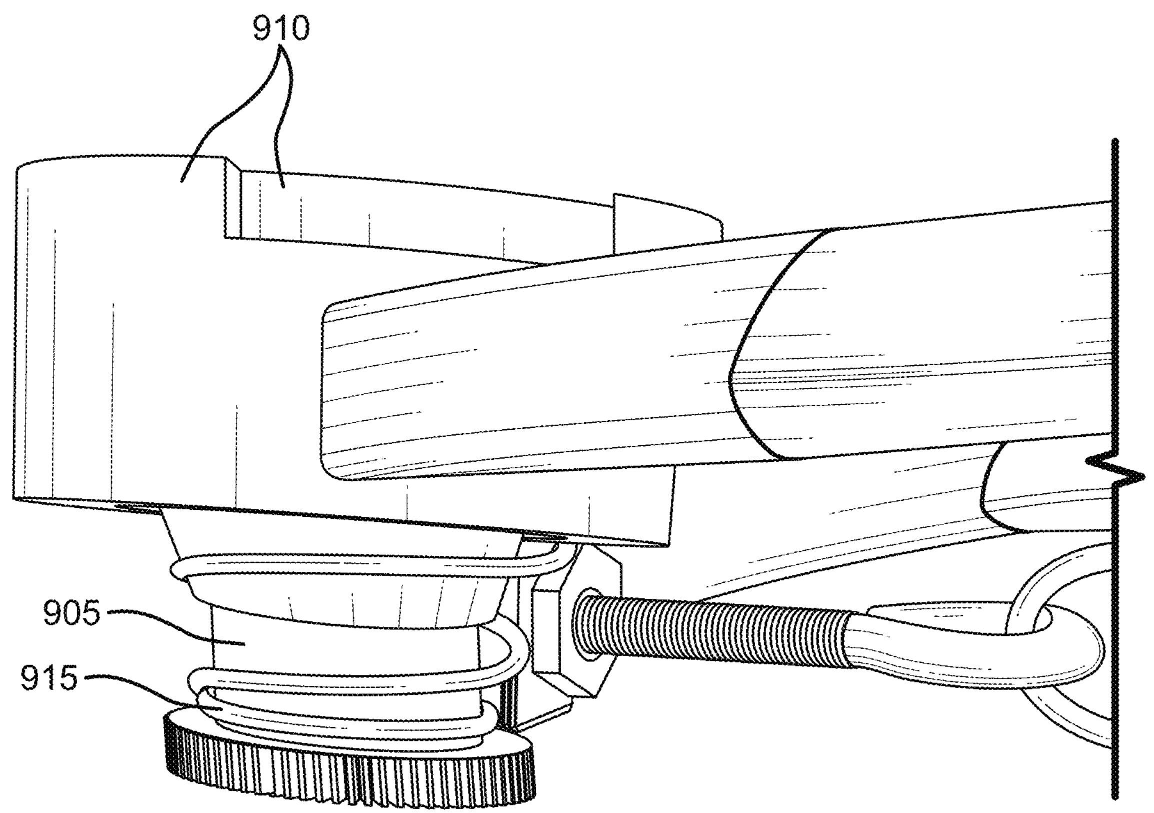
FIGS. 9 through 11 show examples of a wing deployment mechanism according to aspects of the present disclosure.

FIG. 9 shows sweep mechanism kinematic details (e.g., vertical positioning mechanism kinematic details) of a wing deployment mechanism 900, according to one or more aspects of the techniques described herein. For instance, a wing deployment mechanism 900 may implement a first cam/follower pair 910, for example, for a first wing (e.g., a port side wing). In some aspects, FIG. 9 shows the first cam/follower pair 910 port side in a stowed position.

Wing deployment mechanism 900 is an example of, or includes aspects of, the corresponding element described with reference to FIGS. 1-3, 6-8, and 10-12. In one aspect, wing deployment mechanism 900 includes first axle 905, first cam/follower pair 910, and first potential energy source 915. First axle 905 is an example of, or includes aspects of, the corresponding element described with reference to FIGS. 8 and 11. First cam/follower pair 910 is an example of, or includes aspects of, the corresponding element described with reference to FIGS. 8 and 11. First potential energy source 915 is an example of, or includes aspects of, the corresponding element described with reference to FIGS. 8 and 11.

Figure 10:
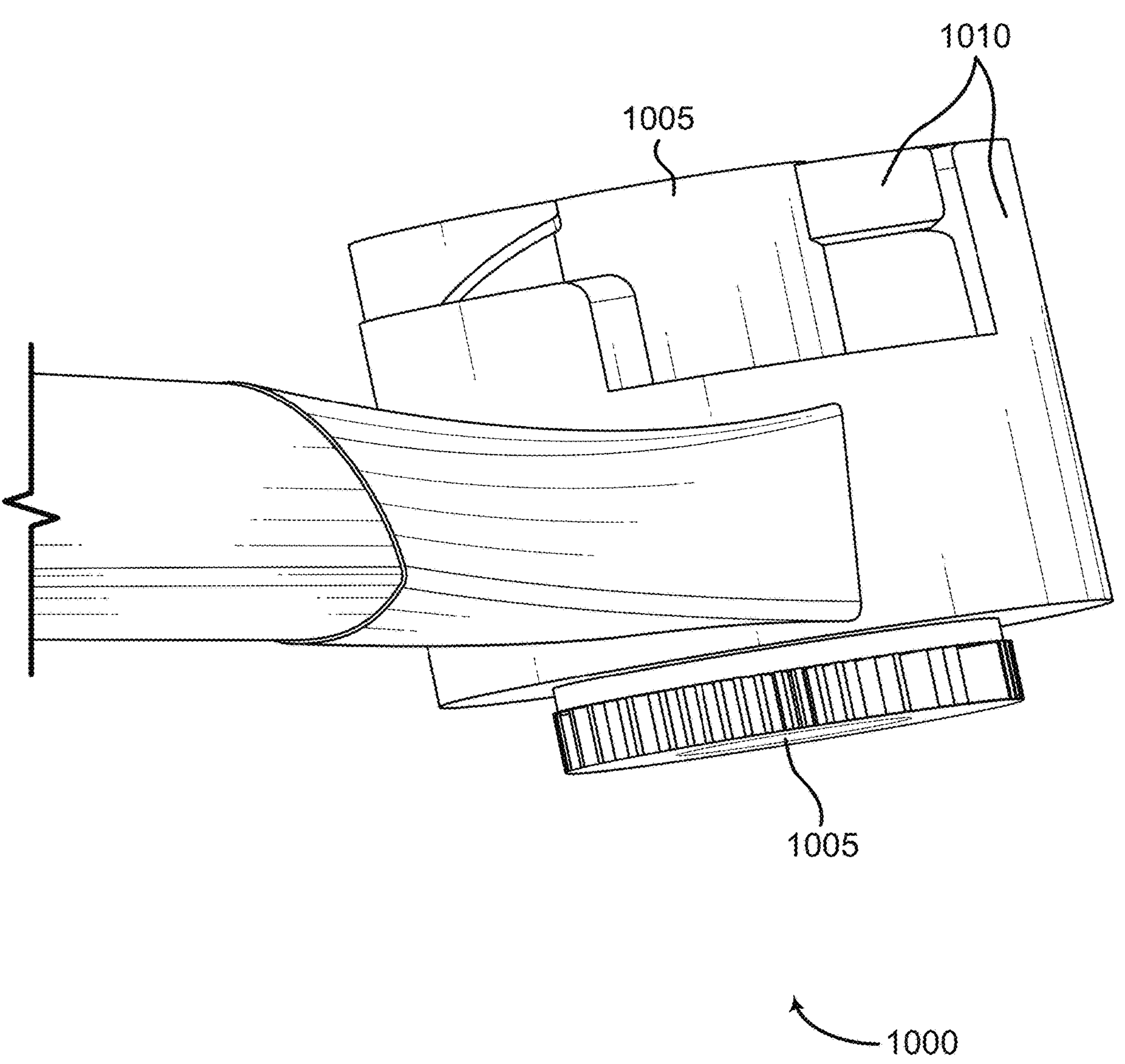

FIG. 10 shows sweep mechanism kinematic details (e.g., vertical positioning mechanism kinematic details) of a wing deployment mechanism 1000, according to one or more aspects of the techniques described herein. For instance, a wing deployment mechanism 1000 may implement a second cam/follower pair 1010, for example, for a second wing (e.g., a starboard side wing). In some aspects, FIG. 10 shows the second cam/follower pair 1010 starboard side in a stowed position. Wing deployment mechanism 1000 is an example of, or includes aspects of, the corresponding element described with reference to FIGS. 1-3, 6-9, 11, and 12.

In one aspect, wing deployment mechanism 1000 includes second axle 1005 and second cam/follower pair 1010. Second axle 1005 is an example of, or includes aspects of, the corresponding element described with reference to FIGS. 8 and 11. Second cam/follower pair 1010 is an example of, or includes aspects of, the corresponding element described with reference to FIGS. 8 and 11. In some aspects, wing deployment mechanism 1000 may include a second potential energy source (e.g., as described in more detail herein, for example, with reference to at least FIGS. 8 and 11).

Figure 11:
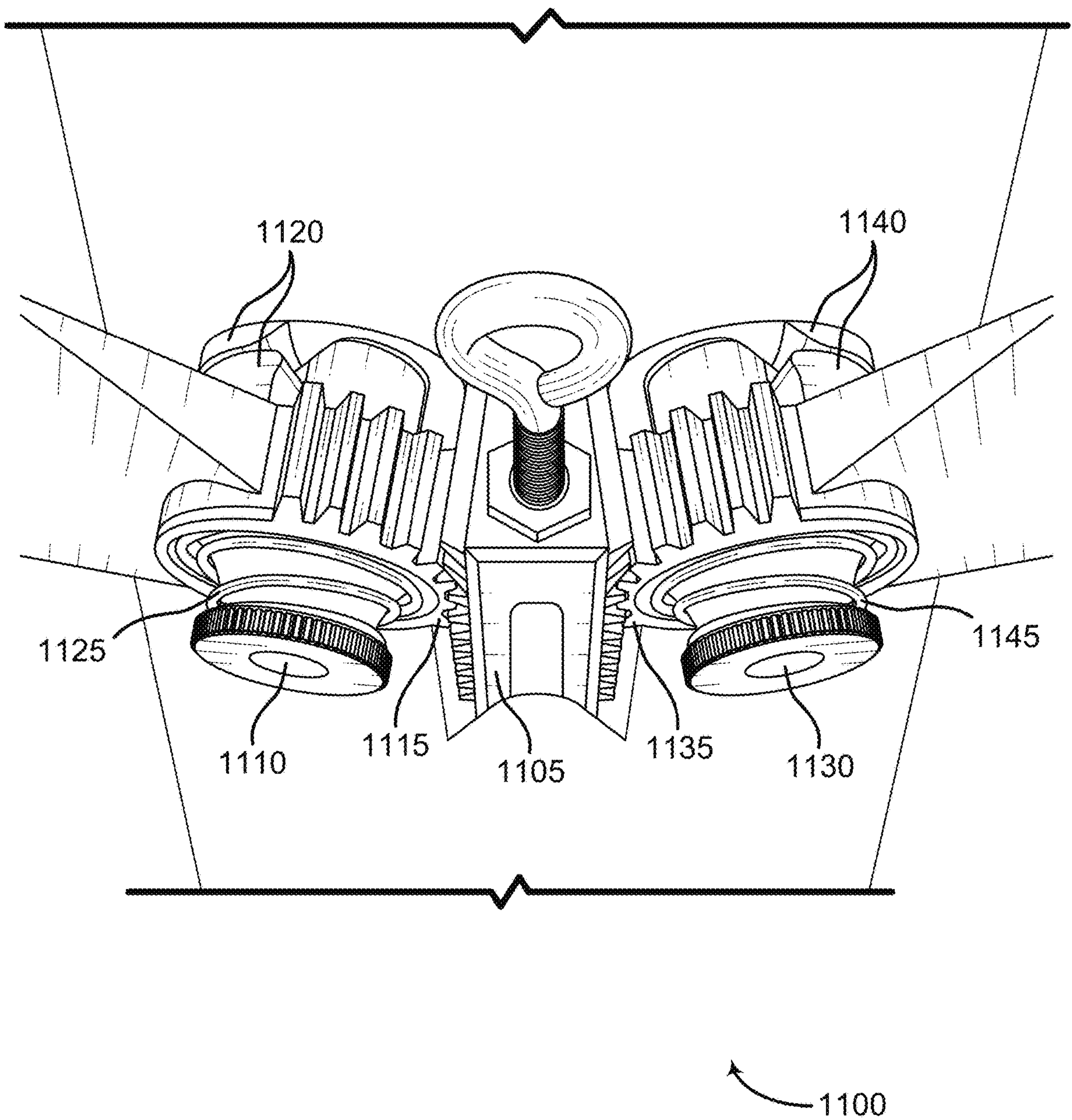

FIG. 11 shows sweep mechanism kinematic details (e.g., vertical positioning mechanism kinematic details) of a wing deployment mechanism 1100, according to one or more aspects of the techniques described herein. For example, a wing deployment mechanism 1100 may implement a first cam/follower pair 1120 for a first wing (e.g., a port side wing) and a second cam/follower pair 1140 for a second wing (e.g., a starboard side wing), respectively. Wing deployment mechanism 1100 is an example of, or includes aspects of, the corresponding element described with reference to FIGS. 1-3, 6-10, and 12.

In some aspects, FIG. 11 shows one or more cam/follower pairs (e.g., such as the first cam/follower pair 1120 and the second cam/follower pair 1140) in a deployed position (e.g., a fully deployed position).

According to some example embodiments, first cam/follower pair 1120 and second cam/follower pair 1140 may translate in opposite directions along the first axle and second axle, respectively, during operation of the wing deployment mechanism 1100 (e.g., during deployment of the first wing and the second wing from a stowed position to a swept/deployed position). For instance, in the example of FIG. 11, a first wing (e.g., a starboard side wing) may be translated in a first direction along first axle (e.g., “down” a first bolt shank of the first axle as oriented in FIG. 11) as the wings are deployed and a second wing (e.g., a port side wing) may be translated in a second direction along second axle (e.g., “up” a second bolt shank of the second axle as oriented in FIG. 11) as the wings are deployed, where the first direction is at least approximately opposite the second direction. In the embodiment shown, as the wings deploy, their final (deployed) positions along their respective axles position the wings equidistant from the airframe. In contrast, in their stowed positions, the first wing is closer to the airframe than the second wing (as a result of the cam/follower pair 1120 and the second cam/follower pair 1140 translating the wings along their axles relative to one another and relative to the airframe), thus moving the wings into an overlapping relationship relative to one another in their stowed positions.

As described herein, the first potential energy source 1125 and the second potential energy source 1145 (e.g., which may each include a conical compression spring, in some examples) may provide forces to maintain first cam/follower pair 1120 contact and second cam/follower pair 1140 contact, respectively.

In one aspect, wing deployment mechanism 1100 includes rack 1105, first axle 1110, first pinion gear 1115, first cam/follower pair 1120, first potential energy source 1125, second axle 1130, second pinion gear 1135, second cam/follower pair 1140, and second potential energy source 1145. Rack 1105 is an example of, or includes aspects of, the corresponding element described with reference to FIG. 8. First axle 1110 is an example of, or includes aspects of, the corresponding element described with reference to FIGS. 8 and 9. First pinion gear 1115 is an example of, or includes aspects of, the corresponding element described with reference to FIG. 8. First cam/follower pair 1120 is an example of, or includes aspects of, the corresponding element described with reference to FIGS. 8 and 9. First potential energy source 1125 is an example of, or includes aspects of, the corresponding element described with reference to FIGS. 8 and 9. Second axle 1130 is an example of, or includes aspects of, the corresponding element described with reference to FIGS. 8 and 10. Second pinion gear 1135 is an example of, or includes aspects of, the corresponding element described with reference to FIG. 8. Second cam/follower pair 1140 is an example of, or includes aspects of, the corresponding element described with reference to FIGS. 8 and 10. Second potential energy source 1145 is an example of, or includes aspects of, the corresponding element described with reference to FIGS. 8 and 10.

Figure 12:
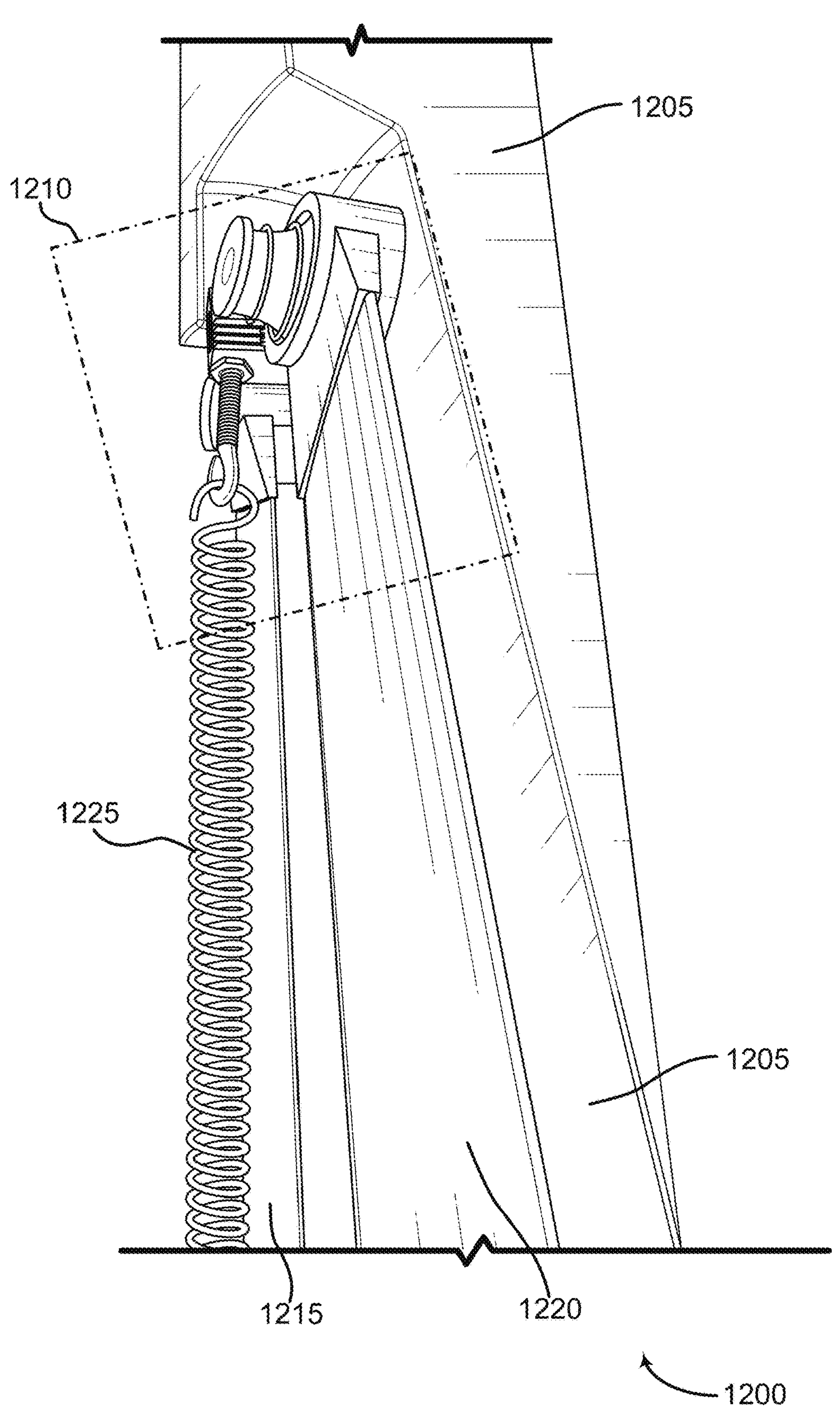
FIG. 12 shows an example of a wing deployment system according to aspects of the present disclosure.

FIG. 12 shows one or more aspects of wing storage (e.g., by wing deployment system 1200) according to the present disclosure. For instance, FIG. 12 may illustrate one or more aspects of wings (e.g., a first wing 1215 and a second wing 1220 of a wing deployment system 1200) in an intermediate position (e.g., in a position between a stowed state and a swept/deployed state). For instance, wings may be in an intermediate position as wings are being deployed from a stowed state to a swept/deployed state, or wings may be in an intermediate position as wings are being retracted or stowed from a swept/deployed state to a stowed state.

For example, as described in more detail herein, wings may be stowed in a body (e.g., in airframe 1205 or otherwise in a body of a vehicle employing wing deployment systems 1200 and/or wing deployment mechanisms 1210 described herein), such that the wings are stowed overlapping, with appropriate clearances, with increased or maximized surface area, etc.

For instance, in the example of FIG. 12, first wing 1215 and second wing 1220 may be in an overlapping, stowed position above the primary potential energy source 1225 (e.g., first wing 1215 and second wing 1220 may be in an overlapping, stowed position located in a storage compartment of an airframe 1205 or located between the primary potential energy source 1225 and the airframe 1205). In some aspects, when stowed, the first wing 1215 and the second wing 1220 may be overlapping based on variation in vertical positioning of the wings within the storage compartment (e.g., based on variation of the first wing 1215 and the second wing 1220 in the vertical direction, or a direction parallel to the length of the axles of the wing deployment system 1200). For example, the stowed wings may be overlapping in the storage compartment, and the wings may translate in opposite directions along respective axles such that the second wing 1220 is a mirror opposite the first wing 1215 about the buttock line when deployed (e.g., as described in more detail herein, for example, with reference to FIGS. 8-11). In other words, in accordance with one or more aspects of the present disclosure, the wings may be overlapping when stowed, but the wings may be deployed to a same vertical position, based on translational movement along the axles such that the second wing 1220 is a mirror opposite the first wing 1215 about the buttock line when deployed (e.g., such that a rolling moment is not induced when the first wing 1215 and the second wing 1220 are deployed to swept/deployed positions). As such, in one example embodiment, 15-deg dihedral wings may be fully deployed, with minimal impact to aero flow while deploying. Wings (e.g., first wing 1215 and second wing 1220) may be deployed smoothly (e.g., with minimal or no interferences) while maintaining cam-follower contact.

Accordingly, one or more aspects of the present disclosure provide for efficient internal fits and clearances of wing deployment mechanism 1210 components. For example, wing deployment systems 1200 and wing deployment mechanisms 1210 according a to the present disclosure may be space efficient (e.g., airframe 1205 space efficient) and wing surface area maximizing, in addition to providing free motion of the wings (e.g., and other wing deployment mechanism 1210 components). Further, as described in more detail herein, wings may clear openings of an airframe 1205, wings may clear opening covers, etc. Moreover, techniques and systems described herein enable free motion of the rack and pinion, as well as steady/straight positioning of the rack (e.g., with or without a guiding dowel pin).

Friction losses within the wing deployment mechanism 1210 may be reduced or minimized, sufficient tension force can be achieved to overcome friction against wing flyout, and sufficient spring force may be achieved to maintain cam-follower pair contact (e.g., and thus to achieve proper vertical wing positioning at an end state, or at the swept/deployed state). In some cases, a small ball detent may lock the sweep in the final position (e.g., a small ball detent may lock the wings in a swept or deployed state).

Wing deployment system 1200 is an example of, or includes aspects of, the corresponding element described with reference to FIGS. 1-8. In one aspect, wing deployment system 1200 includes airframe 1205, wing deployment mechanism 1210, first wing 1215, second wing 1220, and primary potential energy source 1225. Airframe 1205 is an example of, or includes aspects of, the corresponding element described with reference to FIGS. 1-8. Wing deployment mechanism 1210 is an example of, or includes aspects of, the corresponding element described with reference to FIGS. 1-3, and 6-11. First wing 1215 is an example of, or includes aspects of, the corresponding element described with reference to FIGS. 2-6, and 8. Second wing 1220 is an example of, or includes aspects of, the corresponding element described with reference to FIGS. 2-4, and 6-8. Primary potential energy source 1225 is an example of, or includes aspects of, the corresponding element described with reference to FIGS. 3, 6, and 8.

FIG. 13 shows an example of a method 1300 for aerial vehicles according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system moves a first wing from a first stowed position to a first deployed position. In some cases, the operations of this step refer to, or may be performed by, a wing deployment mechanism as described with reference to FIGS. 1-3, and 6-12. In some cases, the operations of this step refer to, or may be performed by, a first wing as described with reference to FIGS. 2-6, 8, and 12.

At operation 1310, the system moves a second wing from a second position to a second deployed position, where the moving of the first wing includes moving the first wing on a first axle having a first rotational axis, where an angle of the first rotational axis forms a compound angle with respect to a buttock line and a waterline of an airframe in such manner that the first wing rotated about the first rotational axis sweeps from the first stowed position parallel to the waterline to the first deployed position forming a first dihedral or anhedral angle relative to the waterline, where the moving the second wing includes moving the second wing on a second axle having a second rotational axis, and where an angle of the second rotational axis forms a compound angle with respect to the buttock line and the waterline of the airframe in such manner that a second wing rotated about the second rotational axis sweeps from the second stowed position parallel to the waterline to the second deployed position forming a second dihedral or anhedral angle relative to the waterline, and in such manner that the second wing is a mirror opposite the first wing about the buttock line. In some cases, the operations of this step refer to, or may be performed by, a wing deployment mechanism as described with reference to FIGS. 1-3, and 6-12. In some cases, the operations of this step refer to, or may be performed by, a second wing as described with reference to FIGS. 2-4, 6-8, and 12.

In some aspects, the method 1300 includes moving a double-sided rack interposed between and engaged with a first pinion gear and a second pinion gear, wherein translation of the double-sided rack imparts a first rotation to the first pinion gear in a first rotational direction, wherein the translation of the double-sided rack imparts a second rotation to the second pinion gear in a second rotational direction, wherein the second rotational direction is substantially opposite the first rotational direction, and wherein the first pinion gear is coupled to the first wing, and thereby moves the first wing from the first stowed position to the first deployed position, and where the second pinion gear is coupled to the second wing, and thereby moves the second wing from the second stowed position to the second deployed position.

In some aspects, the method 1300 further includes applying a first force separating a distal end of the first axle and the first wing, wherein the first axle is coupled to the airframe. In some aspects, the method 1300 further includes applying a second force separating a distal end of the second axle and the second wing, wherein the second axle is coupled to the airframe.

In some aspects of the method 1300, the first force comprises a first spring force, and wherein the second force comprises a second spring force. In some aspects of the method 1300, the first force maintains a first cam/follower pair in contact with one another, and the force maintains a second cam/follower pair in contact with one another. In some aspects of the method 1300, moving the first wing comprises moving the first wing from a first stowed position below the waterline, and moving the second wing comprises moving the second wing from a second stowed position below the waterline.

In some aspects, the method 1300 further includes imparting a first moment to the first wing and a second moment to the second wing via a potential energy source (e.g., a primary potential energy source, such as a spring or other potential energy source) coupled to the first wing and the second wing. In some aspects, the first moment has a first direction and a magnitude, and the second moment has a second direction opposite the first direction, and the magnitude.

FIG. 14 shows an example of a method 1400 for aerial vehicles according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system moves a double-sided rack interposed between and engaged with a first pinion gear and a second pinion gear, where translation of the double-sided rack imparts a first rotation to the first pinion gear in a first rotational direction, where the translation of the double-sided rack imparts a second rotation to the second pinion gear in a second rotational direction, where the second rotational direction is substantially opposite the first rotational direction, and where the first pinion gear is coupled to a first wing and the second pinion gear is coupled to a second wing. In some cases, the operations of this step refer to, or may be performed by, a wing deployment mechanism as described with reference to FIGS. 1-3, and 6-12. In some cases, the operations of this step refer to, or may be performed by, a rack as described with reference to FIGS. 8 and 11.

At operation 1410, the system moves the first wing from a first stowed position to a first deployed position based on moving the double-sided rack, where the moving of first wing includes moving the first wing on a first axle having a first rotational axis, where an angle of the first rotational axis forms a compound angle with respect to a buttock line and a waterline of an airframe in such manner that the first wing rotated about the first rotational axis sweeps from the first stowed position parallel to the waterline to the first deployed position forming a first dihedral or anhedral angle relative to the waterline. In some cases, the operations of this step refer to, or may be performed by, a wing deployment mechanism as described with reference to FIGS. 1-3, and 6-12. In some cases, the operations of this step refer to, or may be performed by, a first wing as described with reference to FIGS. 2-6, 8, and 12.

At operation 1415, the system moves the second wing from a second position to a second deployed position based on moving the double-sided rack, where the moving the second wing includes moving the second wing on a second axle having a second rotational axis, and where an angle of the second rotational axis forms a compound angle with respect to the buttock line and the waterline of the airframe in such manner that a second wing rotated about the second rotational axis sweeps from the second stowed position parallel to the waterline to the second deployed position forming a second dihedral or anhedral angle relative to the waterline, and in such manner that the second wing is a mirror opposite the first wing about the buttock line. In some cases, the operations of this step refer to, or may be performed by, a wing deployment mechanism as described with reference to FIGS. 1-3, and 6-12. In some cases, the operations of this step refer to, or may be performed by, a second wing as described with reference to FIGS. 2-4, 6-8, and 12.

FIG. 15 shows an example of a method 1500 for aerial vehicles according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system imparts a first moment to a first wing and a second moment to a second wing via a potential energy source coupled to the first wing and the second wing, where the first moment has a first direction and a magnitude, and where the second moment has a second direction opposite the first direction, and the magnitude. In some cases, the operations of this step refer to, or may be performed by, a wing deployment mechanism as described with reference to FIGS. 1-3, and 6-12. In some cases, the operations of this step refer to, or may be performed by, a primary potential energy source as described with reference to FIGS. 3, 6, 8, and 12.

At operation 1510, the system moves a first wing from a first stowed position to a first deployed position based on the first moment imparted to the first wing. In some cases, the operations of this step refer to, or may be performed by, a wing deployment mechanism as described with reference to FIGS. 1-3, and 6-12. In some cases, the operations of this step refer to, or may be performed by, a first wing as described with reference to FIGS. 2-6, 8, and 12.

At operation 1515, the system moves a second wing from a second position to a second deployed position based on the second moment imparted to the second wing, where the moving of first wing includes moving the first wing on a first axle having a first rotational axis, where an angle of the first rotational axis forms a compound angle with respect to a buttock line and a waterline of an airframe in such manner that the first wing rotated about the first rotational axis sweeps from the first stowed position parallel to the waterline to the first deployed position forming a first dihedral or anhedral angle relative to the waterline, where the moving the second wing includes moving the second wing on a second axle having a second rotational axis, and where an angle of the second rotational axis forms a compound angle with respect to the buttock line and the waterline of the airframe in such manner that a second wing rotated about the second rotational axis sweeps from the second stowed position parallel to the waterline to the second deployed position forming a second dihedral or anhedral angle relative to the waterline, and in such manner that the second wing is a mirror opposite the first wing about the buttock line. In some cases, the operations of this step refer to, or may be performed by, a wing deployment mechanism as described with reference to FIGS. 1-3, and 6-12. In some cases, the operations of this step refer to, or may be performed by, a second wing as described with reference to FIGS. 2-4, 6-8, and 12.

While the invention herein disclosed has been described by means of specific embodiments, examples and applications thereof, numerous modifications and variations could be made thereto by those skilled in the art without departing from the scope of the invention set forth in the claims.

What is claimed is:

1. An apparatus comprising:

a first axle having a first rotational axis, wherein an angle of the first rotational axis forms a compound angle with respect to a buttock line and a waterline of an airframe in such manner that a first wing rotated about the first rotational axis sweeps from a position parallel to the waterline to a swept position forming a first dihedral or anhedral angle relative to the waterline;

a second axle having a second rotational axis, wherein an angle of the second rotational axis forms a compound angle with respect to the buttock line and the waterline of an airframe in such manner that a second wing rotated about the second rotational axis sweeps from a position parallel to the waterline to a position forming a second dihedral or anhedral angle relative to the waterline, and in such manner that the second wing is a mirror opposite the first wing about the buttock line;

a first wing coupled to the first axle allowing the first wing to rotate about the first rotational axis and allowing the first wing to translate along the first axle;

a second wing coupled to the second axle allowing the second wing to rotate about the second rotational axis and allowing the second wing to translate along the second axle;

a first cam/follower pair, wherein the first cam/follower pair moves the first wing toward a distal end of the first axle as the first wing is moved to a deployed position; and a second cam/follower pair, wherein the second cam/follower pair moves the second wing toward a proximal end of the second axle as the second wing is moved to a deployed position, wherein the first wing and the second wing overlap one another in a stowed position.

2. The apparatus of claim 1 further comprising:

a first pinion gear coupled to the first wing;

a second pinion gear coupled to the second wing; and a double-sided rack interposed between and engaged with the first pinion gear and the second pinion gear, wherein translation of the double-sided rack imparts a first rotation to the first pinion gear in a first rotational direction, and wherein the translation of the double-sided rack imparts a second rotation to the second pinion gear in a second rotational direction, wherein the second rotational direction is mirror opposite the first rotational direction about the buttock line.

3. The apparatus of claim 1 further comprising:

a first potential energy source necessary to maintain cam/follower mechanism contact for the first wing, wherein the first axle is coupled to the airframe; and a second potential energy source necessary to maintain cam/follower mechanism contact for the second wing, wherein the second axle is coupled to the airframe.

4. The apparatus of claim 3 further comprising:

a third energy source necessary to deploy the wings from stowed to deployed position.

5. The apparatus of claim 4 wherein said first potential energy source imparts a force to maintain said first cam/follower pair in contact with one another, and wherein said second potential energy source imparts a force to maintain said second cam/follower pair in contact with one another.

6. The apparatus of claim 1 further comprising:

a potential energy source coupled to the first wing and the second wing wherein the potential energy source imparts a first moment to the first wing, and a second moment to the second wing, wherein the first moment has a first direction and a magnitude, and wherein the second moment has a second direction opposite the first direction, and the magnitude.

7. The apparatus of claim 6 further comprising:

a rack that couples said potential energy source to said first wing and said second wing.

8. The apparatus of claim 7 wherein said rack is a double-sided rack.

9. The apparatus of claim 8 further comprising:

a first pinion coupled to said first wing, wherein the first pinion engages with a first side of said double-sided rack;

a second pinion coupled to said second wing, wherein the second pinion engages with a second side of said double-sided rack.

10. The apparatus of claim 7 wherein said potential energy source is coupled to said rack, and applies a linear force to said rack.

11. The apparatus, of claim 7 further comprising;

a first pinion coupled to said first wing, wherein the first pinion engages with said rack.

12. The apparatus of claim 1 further comprising:

a pair of openings for deploying said first wing and said second wing, wherein said pair of openings is below said waterline.

13. The apparatus of claim 1 wherein said first dihedral or anhedral angle and said second dihedral or anhedral angle have a magnitude of at least 5 degrees.

14. The apparatus of claim 1 wherein said first dihedral or anhedral angle and said second dihedral or anhedral angle have a magnitude of at least 15 degrees.

15. The apparatus of claim 1 further comprising:

a pair of covers, wherein said pair of covers moves from a closed position to an open position to expose said first wing and said second wing at side openings of said airframe before full deployment of said first wing and said second wing.

16. A wing deployment method comprising:

moving a first wing from a first stowed position to a first deployed position; and moving a second wing from a second stowed position to a second deployed position;

wherein said moving the first wing comprises moving the first wing on a first axle having a first rotational axis, wherein an angle of the first rotational axis forms a compound angle with respect to a buttock line and a waterline of an airframe in such manner that the first wing rotated about the first rotational axis sweeps from the first stowed position parallel to the waterline to the first deployed position forming a first dihedral or anhedral angle relative to the waterline, and said moving the first wing further comprises translating along the first axle of the first wing toward a distal end of the first axle as the first wing is rotated to the first deployed position; and wherein said moving the second wing comprises moving the second wing on a second axle having a second rotational axis, wherein an angle of the second rotational axis forms a compound angle with respect to the buttock line and the waterline of an airframe in such manner that a second wing rotated about the second rotational axis sweeps from the second stowed position parallel to the waterline to the second deployed position forming a second dihedral or anhedral angle relative to the waterline, and in such manner that the second wing is a mirror opposite the first wing about the buttock line and said moving the second wing further comprises translating along the second axle of the second wing toward a proximal end of the second axle as the second wing is rotated to the second deployed position.

17. The wing deployment method of claim 16 further comprising:

moving a double-sided rack interposed between and engaged with a first pinion gear and a second pinion gear, wherein translation of the double-sided rack imparts a first rotation to the first pinion gear in a first rotational direction, and wherein the translation of the double-sided rack imparts a second rotation to the second pinion gear in a second rotational direction, wherein the second rotational direction is mirror opposite the first rotational direction about the buttock line;

wherein the first pinion gear is coupled to the first wing, and thereby moves the first wing from said first stowed position to said first deployed position, and where the second pinion gear is coupled to the second wing, and thereby moves the second wing from said second stowed position to said second deployed position.

18. The wing deployment method of claim 16 further comprising:

applying a first force separating a distal end of the first axle and the first wing, wherein the first axle is coupled to the airframe; and applying a second force separating a distal end of the second axle and the second wing, wherein the second axle is coupled to the airframe.

19. The wing deployment method of claim 18:

wherein said first force comprises a first spring force; and wherein said second force comprises a second spring force.

20. The wing deployment method of claim 18 wherein said first force maintains a first cam/follower pair in contact with one another, and wherein said force maintains a second cam/follower pair in contact with one another.

21. The wing deployment method of claim 16 further comprising:

a potential energy source coupled to the first wing and the second wing wherein the potential energy source imparts a first moment to the first wing, and a second moment to the second wing, wherein the first moment has a first direction and a magnitude, and wherein the second moment has a second direction opposite the first direction, and the magnitude.

22. The wing deployment method of claim 16 further comprising:

said moving of said first wing wherein said moving said first wing comprises moving said first wing from a first stowed position below said waterline; and said moving of said second wing wherein said moving said second wing comprises moving said second wing from a second stowed position below said waterline.

23. The wing deployment method of claim 16, further comprising:

said translating the first wing along the first axle toward the distal end of the first axle as the first wing is rotated to the first deployed position is caused by a first cam/follower pair; and said translating the second wing along the second axle of the second wing toward the proximal end of the second axle as the second wing is rotated to the second deployed position is caused by a second cam/follower pair.

* * * * *